(12) United States Patent
Melquist et al.

(10) Patent No.: US 6,375,779 B1
(45) Date of Patent: Apr. 23, 2002

(54) METHOD FOR MAKING STRUCTURES HAVING LOW RADAR REFLECTIVITY

(75) Inventors: James L. Melquist; Walter Phillips, both of Tempe, AZ (US); Paul L. Kuhl, Vista, CA (US)

(73) Assignee: McDonnell Douglas Helicopter Company, Mesa, AZ (US)

( * ) Notice: Subject to any disclaimer, the term of this patent is extended or adjusted under 35 U.S.C. 154(b) by 0 days.

(21) Appl. No.: 09/412,860

(22) Filed: Oct. 5, 1999

Related U.S. Application Data

(62) Division of application No. 08/947,223, filed on Oct. 8, 1997.

(51) Int. Cl.[7] .......................... B32B 27/12; B32B 31/04
(52) U.S. Cl. .................. 156/212; 156/306.9; 156/307.1
(58) Field of Search .............................. 156/212, 306.9, 156/307.1, 256

(56) References Cited

U.S. PATENT DOCUMENTS

| | | | |
|---|---|---|---|
| 3,859,162 A | 1/1975 | Johnson et al. ............. 161/160 |
| 4,073,998 A | 2/1978 | O'Conner | |
| 4,095,008 A | 6/1978 | Sundstrom et al. | |
| 4,136,215 A | 1/1979 | den Otter et al. | |
| 4,470,862 A | 9/1984 | More et al. | |
| 4,508,774 A | 4/1985 | Grabhoefer et al. ........ 428/220 |
| 4,568,603 A | 2/1986 | Oldham | |
| 4,595,623 A | 6/1986 | Du Pont et al. | |
| 4,648,921 A | 3/1987 | Nutter, Jr. | |
| 4,774,121 A | 9/1988 | Vollenweider, II | |
| 4,786,343 A | 11/1988 | Hertzberg | |
| 4,788,230 A | 11/1988 | Mudge | |
| 4,867,826 A | 9/1989 | Wayte | |
| 4,896,164 A | 1/1990 | Burke et al. | |
| 4,908,265 A | 3/1990 | Ferro ...................... 428/318.4 |
| 4,924,228 A | 5/1990 | Novak et al. | |
| 4,956,393 A | 9/1990 | Boyd et al. | |
| 4,977,019 A | 12/1990 | Schaefer | |
| 5,134,421 A | 7/1992 | Boyd et al. | |
| 5,205,887 A | 4/1993 | Yabuya et al. | |
| 5,234,757 A | * 8/1993 | Wong ...................... 428/311.1 |
| 5,254,402 A | 10/1993 | Okubo et al. | |
| 5,323,170 A | 6/1994 | Lang | |
| 5,325,094 A | 6/1994 | Broderick et al. | |
| 5,356,958 A | 10/1994 | Matthews | |
| 5,472,541 A | 12/1995 | Simmons et al. | |
| 5,509,990 A | 4/1996 | Masui et al. | |
| 5,532,295 A | 7/1996 | Harrison et al. | |
| 5,589,243 A | 12/1996 | Day ........................... 428/56 |
| 5,624,728 A | 4/1997 | Hoopingarner et al. | |
| 5,660,901 A | 8/1997 | Wong ........................ 428/35.7 |
| 5,662,293 A | 9/1997 | Hower et al. | |
| 5,665,787 A | 9/1997 | Nowak et al. | |
| 5,667,866 A | 9/1997 | Reese, Jr. | |
| 5,691,390 A | 11/1997 | Harrison et al. | |

(List continued on next page.)

OTHER PUBLICATIONS

"New RTM Technique Cuts Weight and Cost of Aero Surfaces" E.G.; IN FORUM, Nov. Dec. 1983 ; Reader Service Card circle 232.

*Primary Examiner*—Sam Chuan Yao
*Assistant Examiner*—Barbara J. Musser
(74) *Attorney, Agent, or Firm*—Stout, Uxa, Buyan & Mullins, LLP; Donald E. Stout

(57) ABSTRACT

A lightweight, three dimensional structural article having low radar reflectivity characteristics and good mechanical properties is fabricated from a syntactic foam core having a structural outer skin. A syntactic foam sealing adhesive film is applied to the surface of syntactic foam core and under the outer skin to both seal the foam core and adhere the outer skin. The syntactic foam sealing adhesive is formulated to provide a uniform layer and to reduce the fabrication time and labor while improving the overall radar absorbing characteristics of the structural article.

16 Claims, 1 Drawing Sheet

U.S. PATENT DOCUMENTS

| | | |
|---|---|---|
| 5,707,723 A | 1/1998 | Harrison et al. |
| 5,741,574 A | 4/1998 | Boyce et al. |
| 5,776,579 A | 7/1998 | Jessup et al. |
| 5,833,795 A | 11/1998 | Smith et al. |
| 5,844,518 A | 12/1998 | Berg et al. |
| 5,935,680 A | 8/1999 | Childress |
| 6,056,846 A | 5/2000 | Kuhl et al. |

* cited by examiner

METHOD FOR MAKING STRUCTURES HAVING LOW RADAR REFLECTIVITY

This application is a division of Ser. No. 08/947,223, filed Oct. 8, 1997.

FIELD OF THE INVENTION

This invention relates generally to articles made from low-density structural materials and more particularly, to a method of fabricating a low density structural article having a low dielectric constant.

BACKGROUND OF THE INVENTION

A number of aerospace and other structural applications require the use of non-metallic materials which are lightweight and have a low density along with good mechanical and structural properties. More recently, there is an increased need for such materials which also act as electromagnetic and particularly, radar absorbing or transparent materials. For example, radomes that house radar antennas must be lightweight, yet have sufficient structural strength and toughness to withstand the aerodynamic forces experienced during flight. The materials used to construct the radome must be of a sufficiently low dielectric so as not to interfere with the transmitted signals.

Syntactic foams are often used as a lightweight material having good mechanical and structural properties as well as radar absorbing characteristics. These syntactic foams include open pores or cells that are formed by incorporating small diameter hollow objects or microballoons into a resin bonding agent which is then cured into a foam structure. Syntactic foams are generally structurally superior to blown foams, such as polyurethane foam and expanded polystyrene foam. In addition, the lower the density of the foam, the lower the dielectric. However, these syntactic foams generally do not have sufficient mechanical properties, such as strength and outer surface durability, required for aerospace and related structural applications.

In an effort to improve the mechanical and other properties of these syntactic foams, an outer layer of a structural material such as an outer skin is often applied and bonded to the syntactic foam article or core. This outer skin generally improves the mechanical properties of the foam core adding structural strength and rigidity to the finished structural article. However, bonding or otherwise attaching an outer skin to the syntactic foam core has a number of drawbacks and problems.

Typically, a resin adhesive is used to secure the outer skin to the syntactic foam core. Adhesives are also used to secure articles made from the syntactic foam core to other structures. The adhesive is applied to the desired surface of the foam core using a variety of methods and techniques, all of which are labor intensive and time consuming. In addition, the adhesive typically has poor electrical properties relative to the syntactic foam. Specifically, applying an adhesive to the syntactic foam can significantly raise the dielectric or degrades the overall electrical properties, such as the radar absorbing characteristics of the finished structural article.

Prior to applying an adhesive, the syntactic foam core must be sealed. Specifically, any surface on the foam to which a resin type adhesive, a bonding agent or most any other substance will be applied must, be pre-sealed. Pre-sealing prevents the leaching or other draining of the resin matrix from the adhesive or other applied substance into the cells or open pores of the foam core. However, pre-sealing the syntactic foam core is also labor intensive, time consuming, expensive, and generally degrades the radar absorbing characteristics of the finished structural article.

One method of sealing a porous foam, such as a blown foam, is described in U.S. Pat. Ser. No. 5,472,541, issued to Simmons et al. This patent discloses a method for applying a thin coating of a powdered adhesive to a porous foam article to form a sealed layer. After being coated, the foam article is placed on an adhesive coated belt. The belt is then moved into a heating zone where the coating of the adhesive is fully melted to the lower surface of the foam article.

Methods of sealing and applying an adhesive to a surface of a syntactic foam article or core include coating the desired surface of the syntactic foam article with a mastic like sealer. This sealer is generally applied manually, by hand application. After the sealer has been applied, the adhesive can be applied on top of the sealer. These methods, including the applied materials, have many disadvantages. For example, the currently used sealing and adhesive materials have significantly higher dielectric constants than the syntactic foam core. This degrades the radar absorbing characteristics of the overall structural article. The application of both the sealer and the adhesive is time consuming, expensive and the rigors of the manual application process has the potential to crush or otherwise damage the syntactic foam core. It is also difficult to control the thickness of the sealer and adhesive using the current materials and methods.

There is thus a need for a structural article having a syntactic foam core with a structural outer skin and which has improved radar absorbing characteristics. There is also a need for a method of fabricating a three dimensional structural article having improved radar absorbing characteristics.

SUMMARY

The present invention overcomes these problems of the past by providing a lightweight three dimensional structural article, made from a plurality of materials, and which has excellent mechanical properties such as strength and durability as well as good radar absorbing characteristics. The structural article is made from a structural foam core having a structural laminate outer skin and can be formed into most any shape or configuration. In addition, the materials and particularly, the resin systems of the various materials may be specifically formulated and adapted to provide a finished structural article having a desired density and having desired radar absorbing characteristics. By using materials specifically formulated for their improved radar absorbing characteristics and mechanical properties, the finished article retains overall low radar reflectivity characteristics.

The present invention also satisfies the need for a method of fabricating such a lightweight three dimensional article. The method utilizes a syntactic sealing adhesive foam which is compatible with the structural outer skin and which seals the structural foam core. The syntactic foam sealing adhesive material, has a low dielectric constant for improved radar absorbing characteristics. In addition, the materials comprising the syntactic foam sealing film can be formulated to vary density and dielectric constant and thus, modify the properties of the finished structural article. The sealing adhesive film allows the outer skin to be applied to the structural foam core and cured to form the final structural article.

The present invention is generally directed to a three dimensional structural article having a desired configuration and improved radar absorbing characteristics. The article is made from a plurality of low density materials, each having a low dielectric constant. Particularly, the structural article comprises a laminate having a three dimensional syntactic foam core, a layer of a syntactic sealing adhesive film and a structural outer skin.

The syntactic foam core is formed substantially into the desired shape or configuration and includes at least one exposed surface. The syntactic foam core, and particularly, the exposed surface is formed slightly smaller than the final desired configuration to accommodate the thickness of the sealing adhesive film and the outer skin. The outer skin covers the exposed surface and is sized to the desired configuration. The outer skin provides a structurally strong article with a durable surface.

A layer of the foam sealing adhesive film is disposed between the exposed surface on the syntactic foam core and the outer skin. The sealing adhesive film is preferably a prefabricated sheet of a syntactic foam sealing adhesive film having a plurality of microballoons intermixed with a resin. The prefabricated sheet is "B" stage cured and cut or otherwise sized to fit over the exposed surface. The sealing foam seals the exposed surface on the foam core and adheres the foam core to the outer skin.

Methods for making a three dimensional article having a desired shape or configuration from a plurality of materials, each having a low density and low radar reflectivity characteristics, for example, the presently described three dimensional article is included within the scope of the present invention. The method includes the steps of providing a structural thermoplastic syntactic foam core. The syntactic foam core is provided or otherwise formed into substantially the desired configuration and includes at least one exposed surface. Particularly, the foam core is formed slightly undersized from the desired configuration to accommodate the thickness of the additional materials required to fabricate the article.

An outer skin is also provided. The outer skin comprises a plurality of structural fibers intermixed with a resin matrix. The outer skin is formed or applied such that it conforms to the exposed surface on the foam core.

The method also includes the steps of providing a layer of a syntactic foam sealing adhesive film. The sealing adhesive film has a dielectric constant of less than 2.5 to promote the low radar reflectivity characteristics of the finished article. The sealing adhesive film is adapted for sealing the syntactic foam core and for adhering the foam core with the provided outer skin.

The formed foam core is supported such that the exposed surface is not interfered with or obstructed. A layer of the sealing adhesive film is placed over the exposed surface. The outer skin is pre-cured and then placed on the foam core such that the layer of sealing adhesive film is compressed and sandwiched between the outer skin and the exposed surface. This forms the desired configuration of the structural article, but in a pre-cured state. The pre-cured article is then secondarily bonded to form the three dimensional structural article. This step of secondarily bonding cures the sealing adhesive film and the pre-cured outer skin such that the outer skin is cured into a structural outer skin and is also secured to the foam core.

In another aspect of the present invention, the step of providing an outer skin comprises providing a layer of an uncured prepreg material. The uncured or partially cured prepreg outer skin is placed over the sealing adhesive film which was previously placed over the exposed surface of the foam core. In this aspect of the present invention, the prepreg outer skin and the sealing adhesive film are co-cured.

This invention, together with the additional features and advantages thereof, which is only summarized in the foregoing passages, will become more apparent to those of skill in the art upon reading the description of the preferred embodiments, which follows in the specification, taken together with the following drawings.

DESCRIPTION OF THE PREFERRED EMBODIMENTS

Figure 1:
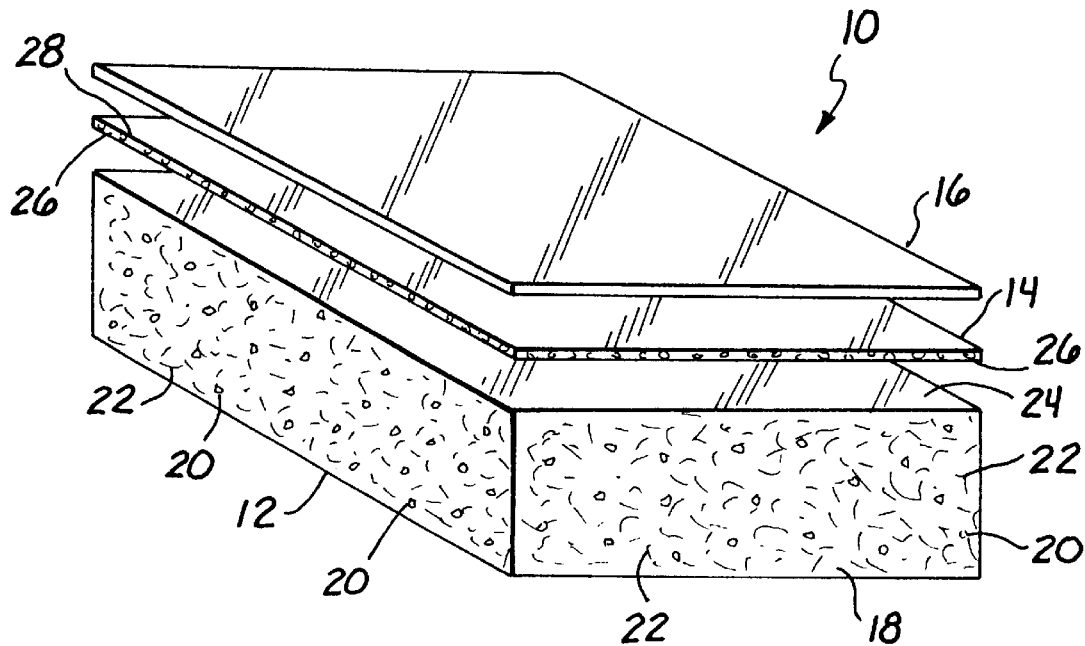
FIG. 1 is a exploded perspective view of an article according to the principles of the present invention.
Figure 2:
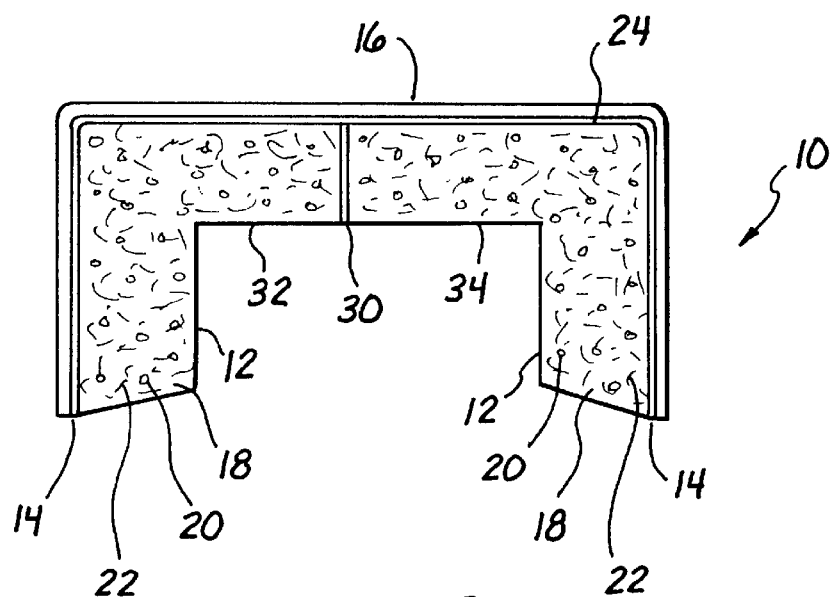
FIG. 2 is a cross-sectional view of an article according to the principles of the present invention.

Referring now to the drawings, wherein like reference characters designate identical or corresponding parts throughout the several views and embodiments, a structural, three dimensional article according to the principles of the present invention is illustrated in FIGS. 1 and 2 and designated by the reference numeral 10. As shown, the structural article 10 is made from a plurality of materials which are secured together.

More specifically, the three dimensional structural article 10 of the present invention is a fabricated laminate which includes a low density structural foam core 12, a layer of a sealing adhesive 14 and an outer skin 16. The structural article 10 may be formed or otherwise configured into a desired shape or configuration, such as the configurations illustrated in the figures. However, the desired configuration may include most any three dimensional shape or configuration.

Each of the plurality of materials 12, 14 and 16 may comprise a low density material which also acts as an electromagnetic radiation absorber such that the fabricated structural article 10 has a low density and low radar reflectivity characteristics as will be described in greater detail below.

The structural foam core 12 may be a syntactic foam which has been formed or otherwise shaped into the desired configuration. Preferably, the foam core 12 is a low density porous thermoplastic syntactic foam having unique electromagnetic energy absorption and structural characteristics. The syntactic foam core 12 may comprise a polymer based resin system 18 intermixed with a plurality of microballoons 20. Fibers 22 may be incorporated into the resin system 18 to improve the absorption of electromagnetic energy and more specifically, the absorption and low reflectivity characteristics relative to radar waves. Preferably, the syntactic foam core 12 will have a dielectric constant of between approximately 1.0 and 2.0 and more preferably of approximately 1.2. A suitable syntactic foam is described in U.S. Pat. Ser. No. 5,532,295, issued to Harrison et al., and entitled, *Thermoplastic Syntactic Foams and Their Preparation,* and which is herein expressly incorporated by reference. The syntactic foam core 12 may also be molded as well as formulated to have different densities, mechanical properties and radar absorbing characteristics. The preparation of the foam core and associated properties is also described in the Harrison et al. patent.

The resin system 18 may include a low molecular weight, partially polymerized oligomeric precursor to a polyethermide polymer. A suitable oligomeric precursor is currently sold under the trademark 1010P, by General Electric Co. The resin 18 binds the microballoons 20 together in a spaced apart array. Air, as well the fibers 22 and other materials, may also be included within the interstices of the mixed resin 18 and microballoons 20 to vary the density as well as the mechanical and electrical properties.

As mentioned, microballoons 20 are mixed and dispersed within the resin 18 to create the syntactic foam core 12. The microballoons 20 may be commercially available hollow bodies ranging in diameter from about 350 microns or less. The microballoons 20 are preferably present in amounts from approximately 3 percent to 90 percent by volume and more preferably, from about 70 percent to 85 percent by volume. Preferred microballoons 20 are sold under the trademark Eccospheres SI microballoons, by W. R. Grace & Co., Canton Mass.

As mentioned, fibers 22 may be incorporated into the resin system 18 to improve the electrical as well as the mechanical properties of the structural foam core 12. The fibers 22 may also be employed to reduce the bulk density of the mixed material to allow a lower density syntactic foam.

The fibers 22 must be compatible with the selected resin system 18 in order to provide good coupling between the fibers 22 and the resin 18. Preferably, the fibers 22 are relatively short and electrically active or resistive. The fibers 22 are typically of a diameter of less than 15 micrometers and a length of no more than 800 micrometers. The fibers 22 may be present in amounts from approximately 0.1 percent to 20 percent by volume.

The fibers 22, which may be resistive in nature, may absorb portions of the electromagnetic radiation and also re-radiate the absorbed energy to other neighboring fibers, resulting in additional energy loss. The fibers 22 may convert some of the electromagnetic energy into heat through the resistance of the generated electrical current in the fibers. The electric field generated by the electromagnetic radiation, such as radar waves, is thus, decreased by both the retransmission of the energy and the conversion into heat. Additionally, the foam core 12 may be formulated to provide good mechanical and structural properties, such as rigidity, low density and high strength.

The syntactic foam core 12 may be molded, formed or otherwise configured into substantially the desired configuration. Forming the foam core 12 into the desired configuration includes forming or otherwise providing at least one exposed surface 24 to which the outer skin 16 may be applied. Because the outer skin 16, as well as the layer of sealing adhesive 14 have a certain thickness, the foam core 12 is preferably formed having a size and configuration slightly smaller than the desired configuration of the finished three dimensional article. Particularly, the foam core 12 is sized such that the addition of the outer skin 16 and the sealing adhesive 14 results in the finished structural article 10 having the desired configuration.

The layer of sealing adhesive 14 may be applied to the exposed surface 24 of the foam core 12. The sealing adhesive 14 acts to seal the porous exposed surface 24 of the syntactic foam core 12 and as an adhesive to secure the outer skin 16. Preferably, the sealing adhesive 14 may be a syntactic foam sealing adhesive film having a dielectric constant of less than 2.5. By using a syntactic sealing adhesive, having a low dielectric, the electromagnetic radiation absorbing characteristics of the layer of sealing adhesive are improved. By using a layer of film 14, a simple application step is required to apply the sealing adhesive film 14 to the foam core 12, greatly reducing the labor and time requirements of prior methods and materials.

The syntactic foam sealing adhesive film 14 may be a resin based film including a plurality of second microballoons 26 intermixed with a second resin system 28. The second resin system 28 may be matched such that it is compatible with the resin system 18 of the structural syntactic foam core 12.

In a preferred embodiment, the sealing adhesive film 14 comprises a lightweight resin base system 28, such as that sold under the trademark Hysol Syncore, by Cytec Engineered Materials of Havre de Grace, MD. A plurality of second fibers or similar materials may also be incorporated into the second resin system 28 to modify the electrical and mechanical properties of the resulting sealing adhesive film 14, similar to that described for the structural foam core 12. Preferably, the sealing adhesive film has a dielectric constant of between approximately 1.4 and 2.5 and has a film thickness of less than 0.03 inches.

The plurality of second microballoons 26 may preferably have a diameter or particle size range from approximately 5 to 300 microns and a balloon density from approximately 0.18 g/ccm and 0.28 g/ccm. The second microballoons 26 may also be similar or identical to the previously described first microballoons 20.

The sealing adhesive film 14 may be configured as a prefabricated sheet or film layer and may be adapted for sealing the exposed surface 24 of the porous foam core 12 and for adhering with the outer skin 16. In order to prevent the resin within the second resin system 28 from leaching or otherwise draining into the open pores of the structural foam core 12, the prefabricated sheet of syntactic foam sealing adhesive film 14 may be slightly pre-cured. Preferably, the prefabricated sheet of sealing adhesive film 14 is "B" stage cured prior to its installation on the structural foam core 12. Small particles may also be added to the adhesive film 14 to reduce the tendency or characteristic to flow. For example, silica particles, such as particles sold under the trademark Cabosil, by Cabot Corporation, may be added to reduce the flow characteristics.

Preferably, the sealing adhesive film 14 is applied as a single sheet or layer of film over the foam core 12. However, in large applications or where unique shapes are encountered, it may be beneficial or even required to apply a number of different sections of the adhesive film 14 to entirely cover the exposed surface 24. Joining the different sections of adhesive film 14 may be accomplished by overlapping or splicing. Preferably, butt splicing techniques may be used.

The outer skin 16 is applied over the exposed surface 24 of the foam core 12 and against the sealing adhesive film 14. The outer skin 16 may be adapted to cover at least a portion of the exposed surface 24 and preferably mate with the entire exposed surface 24. Alternatively, the outer skin 16 may cover more than the exposed surface 24. The outer skin 16 increases the rigidity and strength of the overall structural article 10 as well as providing a durable outer surface. Once cured, the addition of the outer skin 16 and the layer of sealing adhesive film 14 to the foam core 12, forms the desired configuration of the structural article 10. Preferably, the outer skin 16 has a thickness of less than 0.1 inches and more preferably of less than 0.03 inches.

The outer skin 16 may comprise a cloth fabric or other structural fibers intermixed in a third resin system or matrix to form a thin structural skin having a low dielectric. In a preferred embodiment, the outer skin 16 may utilize a fabric or fibers having a very low dielectric loss tangent as compared to fiberglass fabric. Such a fabric may include a quartz fabric supplied by J. P. Stevens Company. The third resin system may be a cyanate ester resin and is preferably a cyanate ester resin having a dielectric of less than 2.8 and more preferably of less than 2.6. However, other fabrics and resins, including prepregs, which provide a structural skin and which are compatible with the foam sealing adhesive film 14 and the structural foam core 12 may also be used.

A method of fabricating a three dimensional structural article having a desired configuration from a plurality of materials is also included within the scope of the present invention. In a preferred embodiment, the method is directed at fabricating the three dimensional structural article 10 described above. Thus, the plurality of materials includes a structural foam core 12, an outer skin 16 and a sealing adhesive layer 16. Preferably, the outer skin 16 and the sealing adhesive film 14 each has a minimized dielectric constant.

The method includes the step of providing a structural foam core base, such as the syntactic foam core 12 described above. The provided foam core is molded or otherwise formed into substantially the desired configuration and includes at least one exposed surface 24. Particularly, the structural foam core 12 is formed slightly undersized from the desired configuration to accommodate the thickness of the additional materials required to fabricate the overall structural article 10.

The structural foam core 12 may be formed or otherwise configured into substantially the desired configuration using a number of methods. One method includes using a mold or form which has been configured or shaped into the desired configuration and also accommodates the thickness requirement of the layer of sealing adhesive 14 and the outer skin 16. The structural foam core 12 is cured within the mold to form the desired configuration less the thickness and volume required for the layer of the sealing adhesive 14 and the outer skin 16. The general method of using a mold to form the syntactic foam core 12, including numerous useable variations, is described in U.S. Pat. Ser. No. 5,532,295, which is herein incorporated by reference as described above.

A second method for forming the syntactic foam core 12 into substantially the desired configuration includes forming the foam core 12 into a first configuration. Portions of the foam core 12 may then be removed until the desired configuration is formed. Additional material may be further removed from the exposed surface 24 to accommodate the thickness of the layer of sealing adhesive film 14 and the outer skin 16 such that the overall structural article 10 comprises the desired configuration.

The first configuration may include a billet or other section of foam material having any shape into which the foam core is originally molded. It is expected that these first configurations will typically include square billets or molded shapes which are slightly oversized and allow for more accurate dimensioning through machining. Removing portions of the foam core 12 may be accomplished using any known machining and similar methods.

The method may also include forming the foam core 12 by joining a number of individual foam core sections together to form substantially the desired configuration. This may include joining a number of billets or first configurations of the foam material. Alternatively, the foam core 12 may be made by joining a number of pre-shaped or configured sections.

The method includes placing a layer of a second syntactic foam sealing adhesive film 30 on a portion of a first foam core section 32. Preferably, the second sealing adhesive 30 is compatible with the first sealing adhesive 14 and more preferably, the two are the same, although this is not likely. A second foam core section 34 may then be placed against the first foam core section 32 to sandwich the layer of the second sealing adhesive film 30. The first and second foam core sections 32 and 34 may be maintained together and heated at the required curing temperature of the second sealing adhesive film 30. The curing permanently joins the sections of the foam core material 32 and 34 together while maintaining a electromagnetic radiation absorbing structure having a low density and a low dielectric constant (preferably less than 2.5 in regions adjacent the outer skin 14). The overall foam core 12 made from the combined foam core sections 32 and 34 may then be formed as previously discussed.

The method also includes the steps of providing a layer of a syntactic foam sealing adhesive film 14. As previously described, the sealing adhesive film 14 may include a prefabricated sheet of a syntactic foam sealing adhesive film 14 having a plurality of microballoons 26 intermixed with a second resin 28.

Providing a layer of the syntactic foam sealing adhesive film 12 may include providing the second resin matrix 28 and heating it to a temperature of between approximately 200 degrees and 275 degrees F. The second plurality of microballoons 28 may be intermixed with the heated resin 28 along with any other desired materials to form a mixture. This may include adding particles such as silica particles or Cabosil, as previously described. Mixing may be performed in a Ross type mixer which may also be used to degas the mixture. The mixture is then formed into a thin film of between 0.005 inches up to approximately 0.03 inches. However, the thin film may also be formed into films of thickness up to 0.1 inch or more. A doctor blade or other squeegee type device may be used to facilitate formation into the thin film or prefabricated sheet. For purposes of this disclosure, the term doctor blade shall include any film fabricating device as is known to those of skill in the art of fabricating films and thin layers of polymers and polymer like materials. Preferably, the sealing adhesive film is then pre-cured to a "B" stage cure and cooled.

An outer skin 16 is also provided as previously discussed. The outer skin 16 is formed or applied such that it conforms to the exposed surface 24 on the structural foam core 12. The outer skin 16 may be provided in a pre-cured or structural form. In this embodiment, the structural outer skin may be formed or otherwise configured into a shell having the desired shape of a portion of the structural article 10 and particularly, the shape of the exposed surface 24. When using a cyanate ester resin, the outer skin 16 may be pre-cured at a temperature of approximately 425 degrees F. to form a solid structural outer skin which conforms to the exposed surface 24 of the structural foam core 12. However, a lower cure temperature may be preferred.

The outer skin 16 may also be provided as a prepreg material which has not been fully cured. In this embodiment, the prepreg outer skin material 16 may be a layer or sheet of prepreg which is cut or otherwise shaped to fit the shape and size of the exposed surface 24. The prepreg outer skin 14 may be partially cured or "B" stage cured as previously described. The prepreg outer skin 16 is then placed over the layer of sealing adhesive film 14. The layer of sealing adhesive film 14 and the prepreg outer skin may then be co-cured. This generally requires that the entire structural article 10 be heated to the curing temperature of the foam sealing adhesive film 14. It is expected that a temperature of between approximately 300 and 400 degrees F. is preferred. However, differing temperatures may be used depending on the formulation of the foam sealing adhesive film 14.

The formed structural foam core 12 is then supported such that the exposed surface 24 is not obstructed or otherwise interfered. A layer of the foam sealing adhesive film 14 is placed over the exposed surface 24. In general, the sealing adhesive film 14 may be cut to fit the exposed surface 24 or alternatively, cut after being placed on the exposed surface 24. The outer skin 16 may then be placed over the exposed surface 24 and onto the foam core 12 such that the layer of sealing adhesive film 14 is compressed and sandwiched between the outer skin 16 and the exposed surface 24. This forms the desired configuration of the structural article 10, but in a pre-cured state.

The pre-cured article 10 is then cured to form the three dimensional structural article 10. This step of curing, which includes heating, cures the sealing adhesive film 14 such that the outer skin 16 is secured to the foam core 12. When the outer skin 16 is provided as a prepreg material which has yet to be fully cured, the curing cures both of the sealing adhesive film 14 and the outer skin 16 together. Alternatively, when the outer skin 16 is pre-cured, only the sealing adhesive film 14 must be cured. Preferably, curing takes place within an autoclave or similar device.

It will be understood that various modifications can be made to the various embodiments of the present invention herein disclosed without departing from the spirit and scope thereof. For example, various combinations of the porous foam core, adhesive sealing layer film and the outer skin are contemplated as well as various formulations of these materials. Also, various modifications may be made in the size, thickness, shape and configuration of the parts and their interaction. Therefore, the above description should not be construed as limiting the invention, but merely as an exemplification of preferred embodiments thereof. Those of skill in the art will envision other modifications within the scope and spirit of the present invention as defined by the claims appended hereto.

What is claimed is:

1. A method of fabricating a three dimensional structural article having a desired configuration from a plurality of materials, each material having low radar reflectivity characteristics, said method comprising the steps of:

providing a low density syntactic foam core;

forming said foam core substantially into the desired configuration, said formed foam core having at least one exposed surface;

providing an outer skin having a plurality of structural fibers intermixed with a resin matrix, said outer skin being configured to fit over and mate with the exposed surface of said formed foam core and having a dielectric constant of less than about 2.8;

providing a syntactic foam sealing adhesive film adapted for sealing said exposed surface of said foam core and adhering with said outer skin, said syntactic foam sealing adhesive film having a dielectric constant of less than about 2.5 and said foam core having a dielectric constant which is less than that of said syntactic foam sealing adhesive film;

supporting the formed foam core;

placing a layer of the sealing adhesive film on the exposed surface of the formed foam core;

placing the outer skin on the formed foam core such that the layer of sealing adhesive film is sandwiched between the outer skin and the exposed surface; and curing the structural article, such that the sealing adhesive film secures the outer skin to the foam core.

2. The method as recited in claim 1 wherein the step of providing a low density syntactic foam core comprises providing a porous thermoplastic syntactic foam core having a plurality of dispersed microballoons.

3. The method as recited in claim 1 wherein the step of forming the foam core comprises preparing the foam core within a mold substantially having the desired configuration.

4. The method as recited in claim 1 wherein the step of forming the foam core comprises the steps of:

preparing the foam core in a first configuration;

removing portions of the foam core from the first configuration until the foam core is substantially formed into the desired configuration.

5. The method as recited in claim 1 wherein the step of providing a foam sealing adhesive film comprises providing a prefabricated sheet of a syntactic foam sealing adhesive film having a plurality of glass microballoons intermixed with a second resin matrix, said prefabricated sheet being "B" stage cured.

6. The method as recited in claim 1 wherein the step of providing an outer skin comprises the steps of:

providing a sheet of a prepreg material; and forming the sheet of the prepreg material into at least a portion of the desired configuration.

7. The method as recited in claim 6, and further comprising the step of curing the formed prepreg material to form a structural outer skin.

8. The method as recited in claim 6 wherein the step of curing comprises curing the outer skin and the sealing adhesive film together.

9. The method as recited in claim 8 wherein the step of curing comprises the steps of:

placing the structural article into an autoclave; and heating the structural article to facilitate curing.

10. A method of fabricating a three dimensional structural article having a desired configuration from a plurality of low density materials, each material having a low radar reflectivity characteristic, said method comprising the steps of:

providing a structural thermoplastic syntactic foam core;

forming said foam core into substantially the desired configuration, said formed foam core having at least one exposed surface;

providing an outer skin material having a plurality of structural fibers intermixed with a resin matrix;

forming said outer skin to conform to at least said exposed surface;

curing said outer skin to form a structural outer skin configured to fit over and mate with the exposed surface of the foam core;

providing a layer of a syntactic foam sealing adhesive film having a low dielectric constant and adapted for sealing the foam core and adhering with the outer skin;

supporting the foam core;

placing the layer of sealing adhesive film over the exposed surface on the foam core;

placing the structural outer skin on the foam core such that the layer of sealing adhesive film is sandwiched between the structural outer skin and the exposed surface; and curing the structural article, such that the sealing adhesive film secures the outer skin to the foam core.

11. The method as recited in claim 10 wherein said step of forming the foam core comprises the steps of joining a plurality of foam core sections to substantially form said desired configuration.

12. The method as recited in claim 11 wherein the step of curing plurality of foam core sections comprises the steps of:

placing a layer of a second syntactic foam sealing adhesive film on a portion of a first foam core section;

placing a second foam core section against the second sealing adhesive film such that the second sealing adhesive film is sandwiched between the first foam core section and the second foam core section;

maintaining each of the form core sections together; and curing the layer of the second syntactic foam sealing adhesive film to join the foam core sections.

13. The method as recited in claim 10 wherein the step of curing comprises the steps of:

placing the formed structural article into an autoclave; and heating the formed structural article to a temperature of between approximately 300 degree F. and 400 degrees F.

14. The method as recited in claim 10 wherein the step of providing a layer of a foam sealing adhesive film comprises the steps of:

providing a second resin matrix;

heating the resin matrix;

adding a plurality of microballoons to said resin matrix;

mixing said microballoons and said second resin matrix;

forming the mixture into a thin layer; and cooling the mixture.

15. The method as recited in claim 14 and further comprising the step of adding a plurality of silica particles to reduce the flow characteristics of the mixture prior to forming the mixture.

16. The method as recited in claim 14 wherein the step of forming the mixture into a thin layer comprises using a doctor blade to form the thin layer having a thickness of between 0.005 inches and 0.03 inches.

* * * * *